United States Patent
Langenbahn

[11] Patent Number: 5,252,078
[45] Date of Patent: Oct. 12, 1993

[54] DRIVE-UP ELECTRIC RECEPTACLE

[76] Inventor: Albert Langenbahn, 704 S. Morgan, Mason City, Ill. 62664

[21] Appl. No.: 21,226

[22] Filed: Feb. 23, 1993

[51] Int. Cl.$^5$ ............................................. H01R 33/00
[52] U.S. Cl. ................................. 439/34; 439/138; 439/489; 320/2
[58] Field of Search .................. 439/34, 35, 137, 138, 439/272, 246, 490, 489; 248/122, 124, 125; 280/65.1, 284, 477; 320/2

[56] References Cited

U.S. PATENT DOCUMENTS

| | | | |
|---|---|---|---|
| 1,551,267 | 8/1925 | Schenck et al. | 439/34 |
| 3,270,267 | 8/1966 | Nolte | 320/56 |
| 3,603,860 | 9/1971 | Johnson | 320/2 |
| 3,813,632 | 5/1974 | Drewry | 339/10 |
| 3,915,476 | 10/1975 | Burkle | 439/34 |
| 4,368,899 | 1/1983 | Smalley et al. | 280/477 |
| 4,850,879 | 7/1989 | Langenbahn | 439/34 |

FOREIGN PATENT DOCUMENTS 1238960  5/1988  Canada ................ 439/34

Primary Examiner—Gary F. Paumen
Assistant Examiner—Hien D. Vu

[57] ABSTRACT

An apparatus provides an electrical interconnection between a stationary fixture and a vehicle. A plug assembly provides a plurality of spaced apart plug electrodes. A standoff holds the plug electrodes in mutually parallel, fixed positions extending horizontally and outwardly therefrom. A base portion is fixed to the vehicle for supporting the standoff. A cover is hingably attached to the base portion such that the cover may be protectively positioned over the standoff and plug electrodes in a first position of the cover. An alternate second position of the cover exposes the standoff and plug electrodes. A socket assembly is adapted for use with the stationary fixture and provides an upper protective plate and a lower protective plate. A plurality of socket electrodes are positioned between the plates. An insulating spacer is included for supporting and separating the socket electrodes. A support is positioned between the fixture and the socket assembly for holding the socket assembly in a preferred position for engaging the plug assembly.

8 Claims, 6 Drawing Sheets

DRIVE-UP ELECTRIC RECEPTACLE

FIELD OF THE INVENTION

This invention relates generally to electrical connectors, and, more particularly, is directed towards a drive-up electrical receptacle for a vehicle.

BACKGROUND OF THE INVENTION

Various devices have been utilized to deliver electrical power to a vehicle for the purpose of recharging batteries of the vehicle, and the like. For example, my previous U.S. Pat. No. 4,850,879, issued on Jul. 25, 1989, illustrates such a device. Likewise, U.S. Pat. No. 3,603,860, issued on Sep. 7, 1971 to Johnson, discloses another such device. A primary objective of such devices is to enable a vehicle with a plug assembly to engage a fixture with a socket assembly, thereby completing an electrical circuit between the fixture and the vehicle in order to supply electrical power to the vehicle. Another objective of such devices is to enable the motion of the vehicle to complete the circuit, thereby eliminating the need for a human operator to manually engage the plug with the socket. As such, these prior art devices are more convenient to use than previously known manual engagement methods.

However, several drawbacks exist to the prior art devices that utilize the motion of the vehicle to complete the electrical circuit. For instance, from the perspective of the driver's seat of the vehicle, it is sometimes difficult to judge when the circuit has been completed. As such, there is a considerable risk that the driver will move the vehicle too far into the fixture and damage it. Such prior art devices are not built to absorb much error on the part of the driver, and therefore tend to be short-lived, even with the best drivers.

A further drawback of such devices is that they require the vehicle to be precisely angularly and laterally aligned with the power fixture. Maneuvering a large vehicle with such precision is difficult, especially in a crowded space such as a garage. As such, devices of this type are inconvenient to use since they typically require several attempts by the driver to precisely align the vehicle with the fixture. Further, if the driver thinks that the vehicle is properly aligned and, in fact, it is not, damage to the fixture may readily result when the vehicle approaches the fixture incorrectly.

A further drawback of some of the prior art devices is that there is no mechanical, reliable indication of when the circuit has been engaged. As such, the driver may have successfully engaged the device and, not aware of such, continues to drive the vehicle forward. Such prior art devices, therefore, tend to become damaged since they do not effectively inform the driver that positive engagement has taken place with the fixture.

Clearly, then, there is a need for a device that allows a driver of a vehicle to quickly and effectively engage a power source to the vehicle. Such a needed device would allow such engagement from a relatively wide range of angular and lateral displacements relative to the power source. Further, such a needed device would indicate clearly when positive engagement of the vehicle to the power source is complete. Such a needed device, moreover, would be forgiving in that it would not become damaged if approached too closely by the vehicle. The present invention fulfills these needs and provides further related advantages.

SUMMARY OF THE INVENTION

The present invention is an apparatus for providing an electrical interconnection between a stationary fixture and a vehicle. A plug assembly provides a plurality of spaced apart plug electrodes. A standoff holds the plug electrodes in mutually parallel, fixed positions extending horizontally and outwardly from the standoff. A base portion is fixed to the vehicle for supporting the standoff. A cover is hingably attached to the base portion such that the cover may be protectively positioned over the standoff and plug electrodes in a first position of the cover. An alternate second position of the cover exposes the standoff and plug electrodes. A socket assembly is adapted for use with the stationary fixture and provides an upper protective plate and a lower protective plate. The protective plates are horizontally disposed, parallel and spaced apart. A plurality of socket electrodes are positioned between the plates. The plates provide general electrical isolation of the socket electrodes from the environment. An insulating spacer is included for supporting and separating the socket electrodes. The socket electrodes each include a curved portion which provides a wiping surface for improved contact with each of the plug electrodes. A supporting means is positioned between the fixture and the socket assembly for holding the socket assembly in a preferred position for engaging the plug assembly.

In operation, the vehicle may be moved to a position whereby the plug assembly engages the socket assembly. Each one of the plug electrodes is forced into contact with one of the socket electrodes to establish a plurality of electrically conductive paths between the plug assembly and the socket assembly. The cover is forced by the upper protective plate to move from the first position to the second position in order to expose the plug electrodes and as a visual indication that engagement has taken place between the plug electrodes and the socket electrodes. Preferably, the cover includes a visual indicia, positioned on the cover so as to be visible by the operator of the vehicle when the cover is positioned in the second position. As such, the indicia indicates to the vehicle operator that engagement of the plug assembly with the socket assembly is complete.

The present invention allows a driver of a vehicle to quickly and effectively engage a power fixture to the vehicle. The present invention also allows such engagement from a relatively wide range of angular and lateral displacements relative to the power fixture. Further, the present invention actively indicates when positive engagement of the vehicle to the power fixture has been completed. Moreover, the present device is forgiving in that it does not become damaged if approached too closely by the vehicle. Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 1A is a partial cross-sectional view the invention, generally along lines 1A—1A of FIG. 1, illustrating a visual indicia;

DETAILED DESCRIPTION OF THE PREFERRED EMBODIMENT

Figure 1:
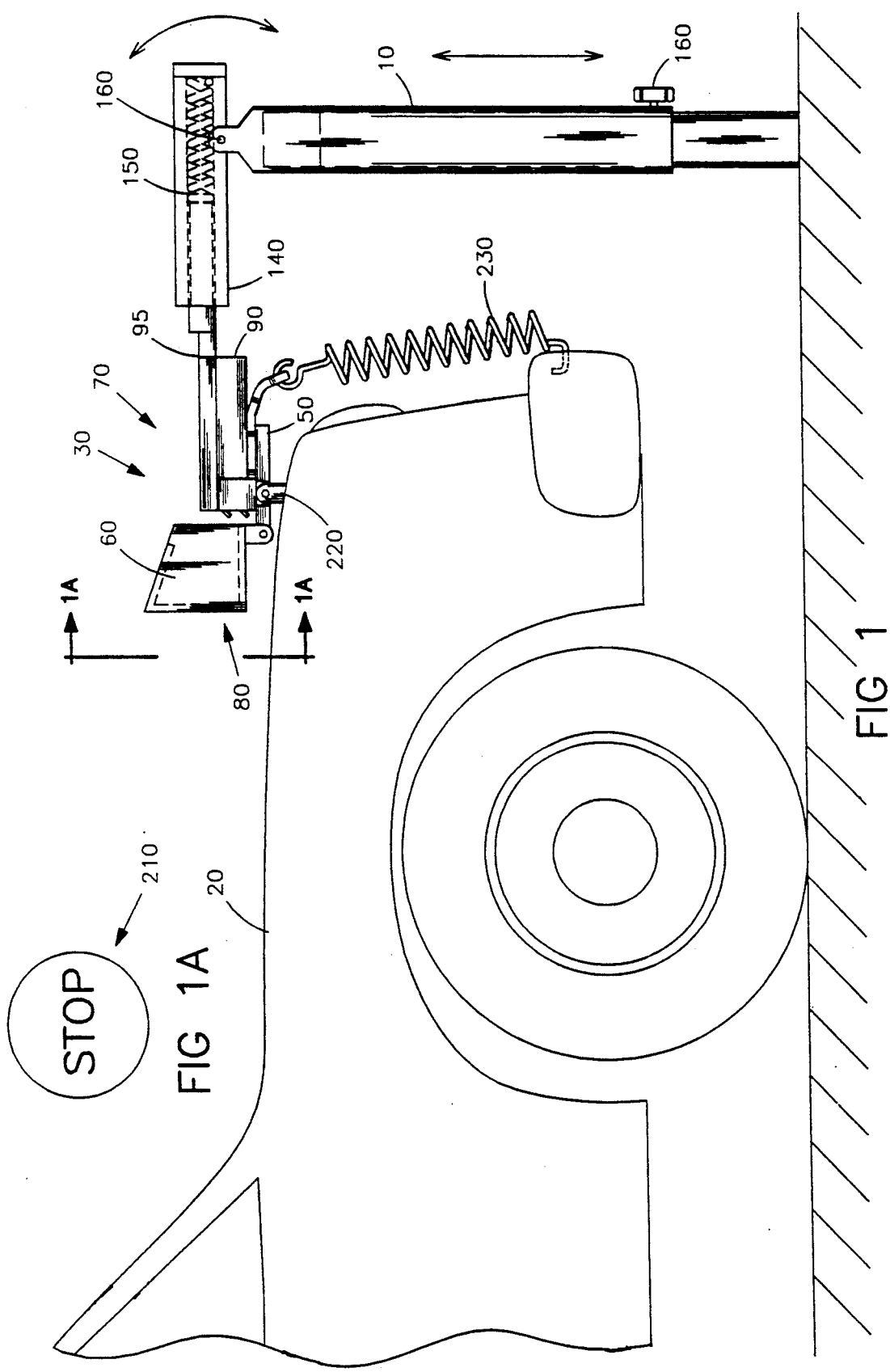
FIG. 1 is a side elevational view of the invention, illustrating a socket assembly engaged with a plug assembly of a vehicle.
Figure 2:
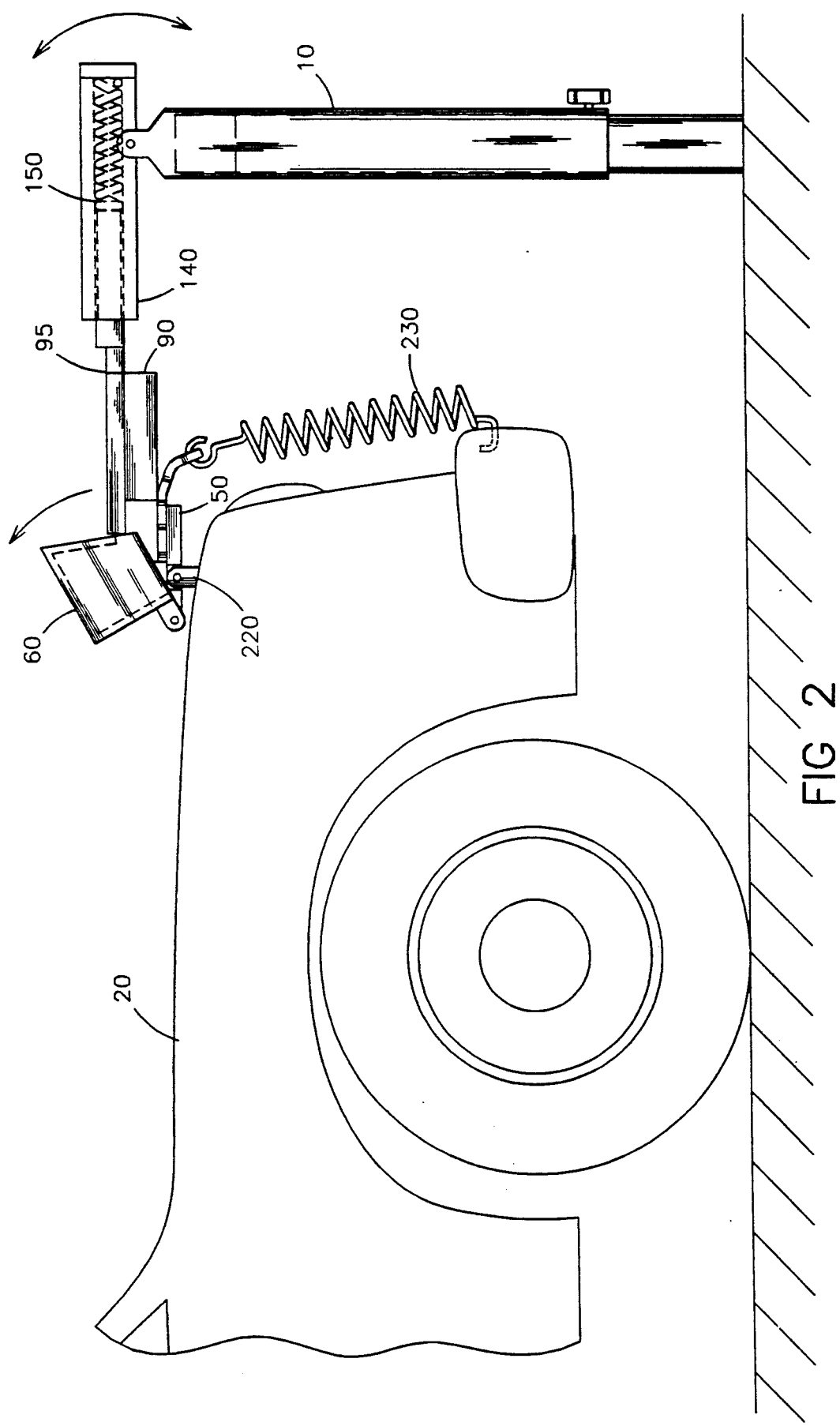
FIG. 2 is a side elevational view of the invention, illustrating the socket assembly of FIG. 1 engaging the plug assembly of the vehicle.
Figure 3:
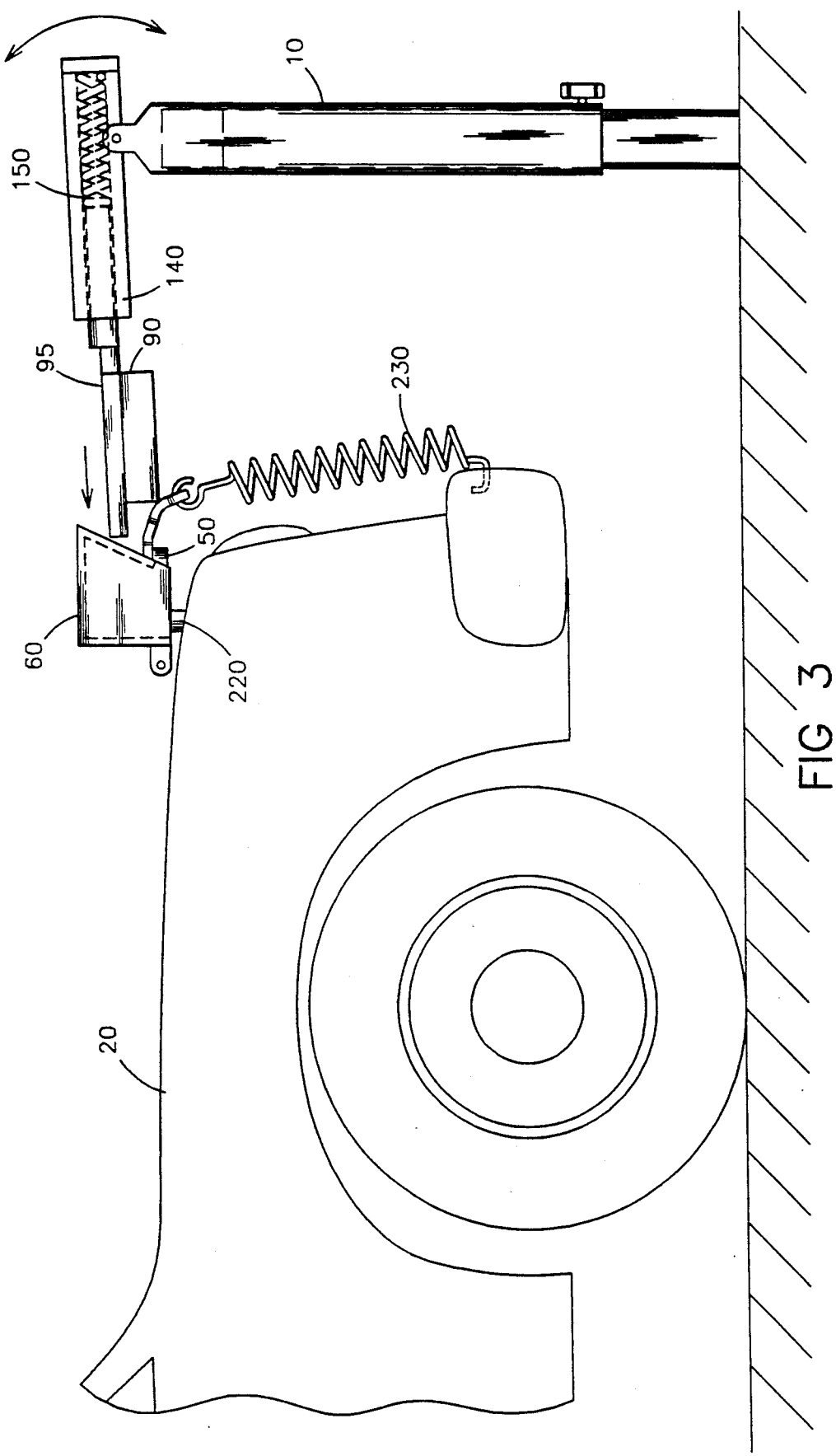
FIG. 3 is a side elevational view of the invention, illustrating the socket assembly of FIG. 1 beginning engagement with the plug assembly.
Figure 4:
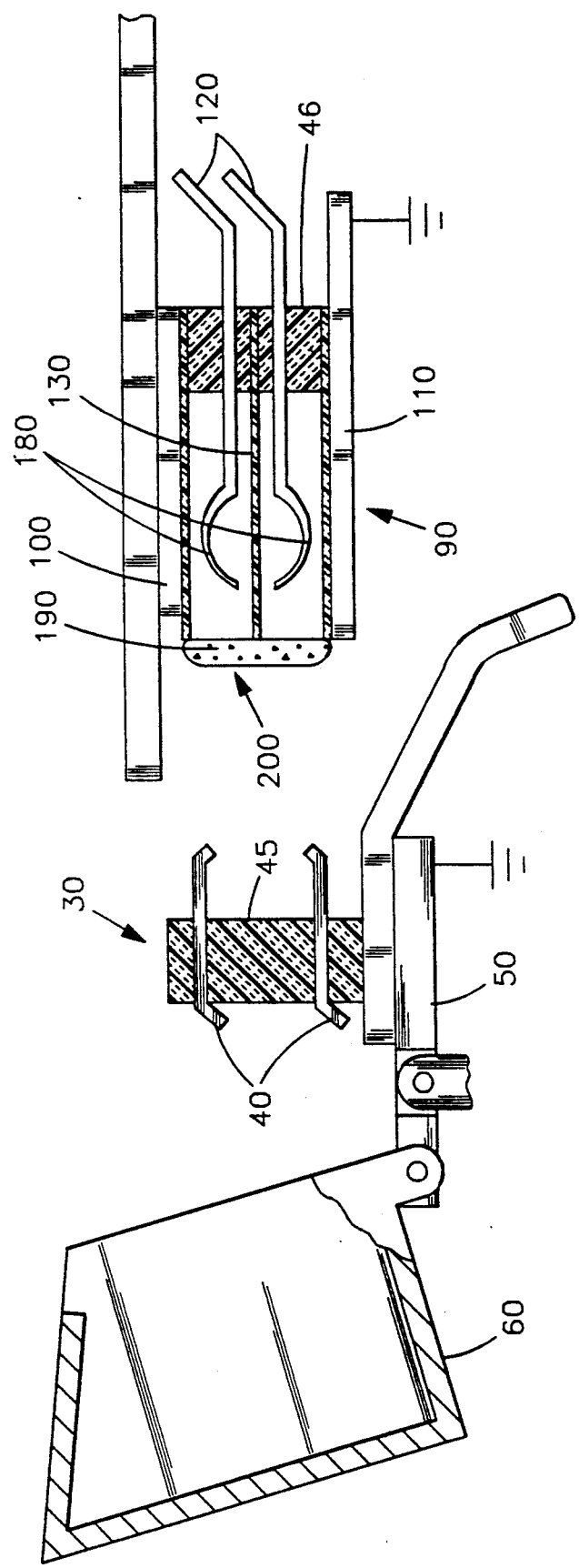
FIG. 4 is a cross-sectional elevational view of the invention of FIG. 1, taken generally along lines 4—4 of FIG. 6, illustrating in more detail the socket assembly before engagement with the plug assembly.
Figure 5:
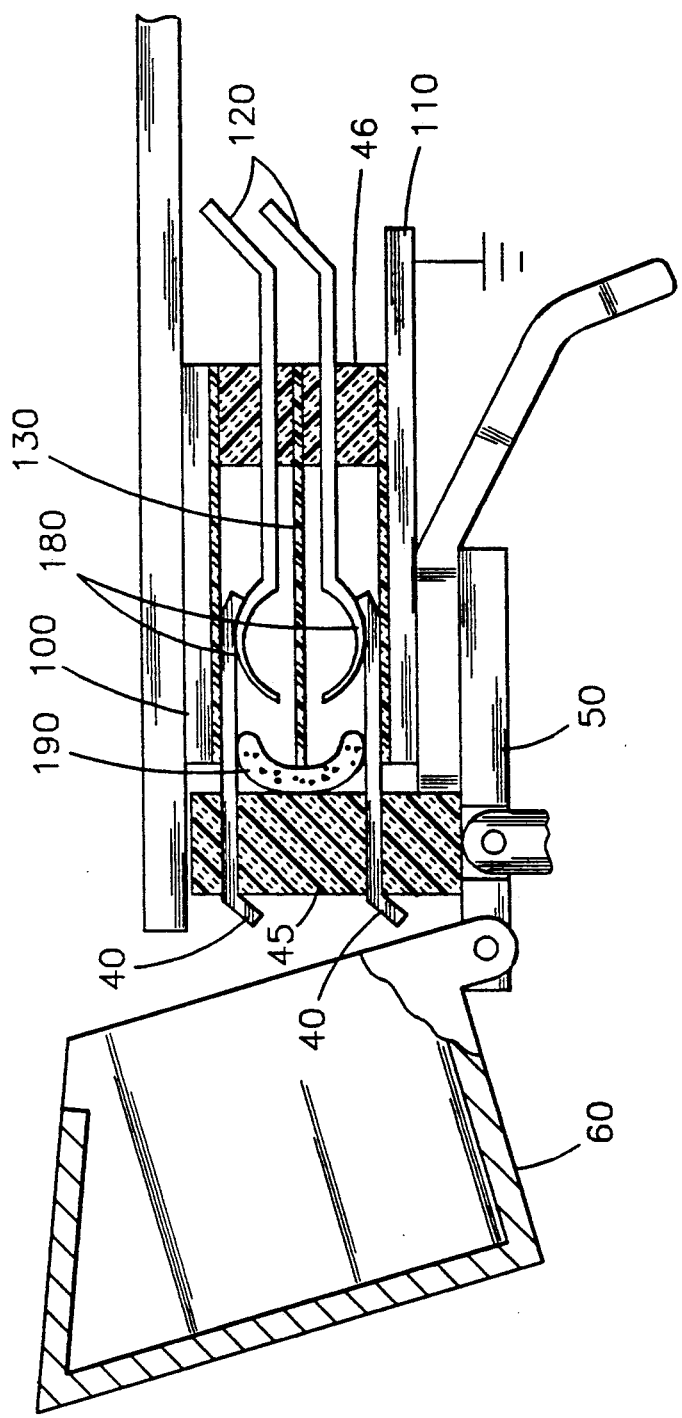
FIG. 5 is a partial side elevational view of the invention of FIG. 1, illustrating in more detail the socket assembly engaged with the plug assembly.

FIG. 1 shows an apparatus for providing an electrical interconnection between a stationary fixture 10 and a vehicle 20. As shown in FIG. 4, a plug assembly 30 provides a plurality of spaced apart plug electrodes 40. A first insulating standoff 45 holds the plug electrodes 40 in mutually parallel, fixed positions extending horizontally and outwardly from the standoff 45. A base portion 50 is fixed to the vehicle 20 for supporting the standoff 45. A cover 60, which encloses an interior space, is hingably attached to the base portion 50 such that the cover 60 may be protectively positioned over the standoff 45 and plug electrodes 40 in a closed position as shown in FIG. 3. An alternate open position of the cover 60 exposes the standoff 45 and plug electrodes 40. Preferably, the base portion 50 includes a pivotal mount 220 so that the base portion 50 may be moved over a range of angles to accommodate the level of a socket assembly 90. The pivotal mount 220 includes a position urging means 230 for urging the plug assembly 30 toward a preferred horizontal position.

The socket assembly 90 is adapted for use with the stationary fixture 10 and provides an upper protective plate 100 and a lower protective plate 110. The protective plates 100, 110 are horizontally disposed, parallel and held in spaced apart positions by a second insulating standoff 46. A plurality of socket electrodes 120 are positioned between the plates 100, 110 and are also held by standoff 46. The plates 100, 110 provide general electrical isolation of the socket electrodes 120 from the environment. A weather seal 190 supported by spacer 130 is further included. The weather seal 190 is made of a flexible material, such as foam rubber, and further includes a sheath 200 of sheet plastic around the foam rubber for providing a wear surface. The seal 190 is held in position between the protective plates 100, 110 such that the plug electrodes 40 engage the seal 190 prior to engaging the socket electrodes 120. The seal 190 is pushed to one side by each plug electrode during the engaging of the plug assembly 30 with the socket assembly 90.

Figure 6:
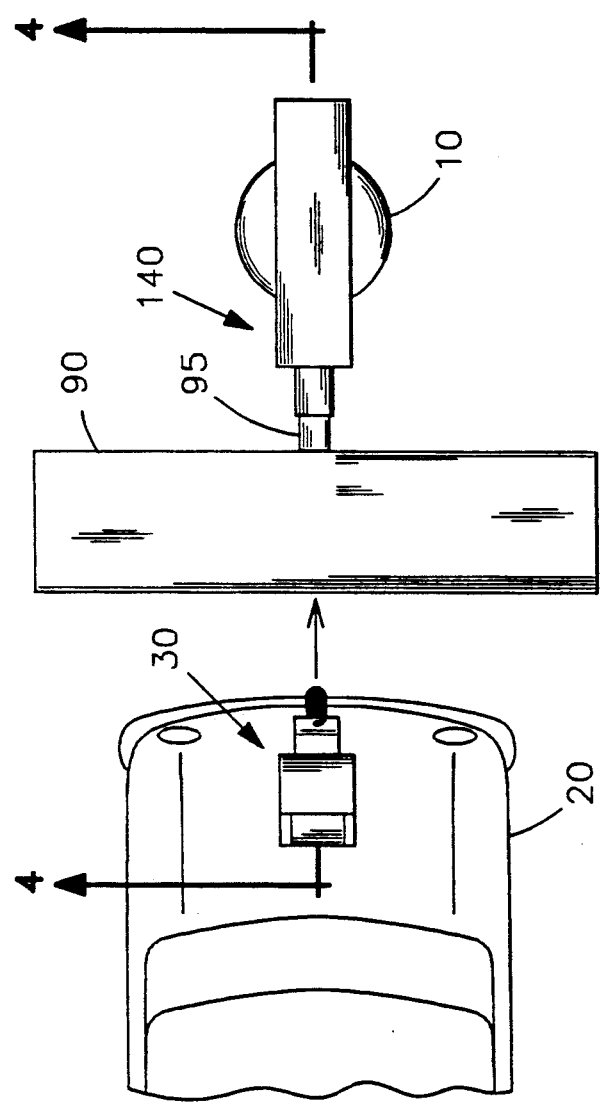
FIG. 6 is a top plan view of the invention, illustrating a vehicle with the plug assembly approaching a fixture with the socket assembly.

Preferably, the socket assembly 90 and the socket electrodes 120 extend transverse to the direction of vehicle motion such that the plug assembly 30 may be brought into contact with the socket assembly 90 for electrical interconnection over a wide range of transverse positions of the vehicle 20 with respect to the fixture 10 (FIG. 6). The socket electrodes each include a curved portion 180 which provides a wiping surface for improved contact with each of the plug electrodes 40.

A supporting means 140 engages socket assembly 90 and is pivotally mounted on fixture 10 with a position adjustment means 160. As such, the supporting means 140 may assume a range of angular positions in order to accommodate plug electrodes 40 at various heights. Preferably, a shock absorbing means 150, such as a coil spring, is included for absorbing coupling forces during engagement of the plug electrodes 40 with the socket electrodes 120. Such coupling forces push engagement arm 95 into the supporting means 140 and against the shock absorbing means 150. The shock absorbing means 150 enables the socket assembly 90 to be moved over a range of positions in the line of motion of the vehicle 20 during coupling of the plug electrodes 40 with the socket electrodes 120.

In operation, the vehicle 20 may be moved to a position whereby the plug assembly 30 engages the socket assembly 90. Each one of the plug electrodes 40 is forced into contact with one of the socket electrodes 120 to establish a plurality of electrically conductive paths between the plug assembly 30 and the socket assembly 90. The cover 60 is forced by the engagement arm 95 to move from the closed position to the open position in order to expose the plug electrodes 40 and as a visual indication that engagement has taken place between the plug electrodes 40 and the socket electrodes 120. Preferably, the cover 60 includes a visual indicia 210, such as the word "STOP", positioned on the cover 60 so as to be visible by the operator of the vehicle 20 when the cover 60 is positioned in the open position 80 (FIG. 1A). As such, the indicia 210 indicates to the vehicle operator that engagement of the plug assembly 30 with the socket assembly 90 is complete.

While the invention has been described with reference to a preferred embodiment, it is to be clearly understood by those skilled in the art that the invention is not limited thereto. Rather, the scope of the invention is to be interpreted only in conjunction with the appended claims.

What is claimed is:

1. An apparatus for providing an electrical interconnection between a stationary fixture and a vehicle comprising:

a plug assembly providing a plurality of spaced apart plug electrodes, a standoff for holding the plug electrodes in mutually parallel, fixed positions extending horizontally and outwardly from the standoff, a base portion fixed to the vehicle for supporting the standoff, and a cover enclosing an interior space, the cover being hingably attached to the base portion such that the cover may be protectively positioned over the standoff and plug electrodes in a closed position of the cover, and may alternately be positioned to expose the standoff and plug electrodes in an open position of the cover;

a socket assembly adapted for use with the stationary fixture, providing upper and lower, horizontally disposed, parallel, spaced apart, protective plates, a plurality of socket electrodes positioned between the plates, the plates providing general electrical isolation of the socket electrodes from the environment; and a support means positioned between the fixture and the socket assembly for holding the socket assembly in a preferred position for engaging the plug assembly;

such that the vehicle may be moved to a position whereby the plug assembly engages the socket assembly, each one of the plug electrodes being forced into contact with one of the socket electrodes to establish a plurality of electrically conductive paths between the plug assembly and the socket assembly, the cover being forced by an engagement arm on the socket assembly to move from the closed position to the open position to expose the plug electrodes and as an indication that engagement has taken place between the plug assembly and the socket assembly.

2. The apparatus of claim 1 wherein the socket electrodes extend transverse to the direction of vehicle motion such that the plug assembly can be brought into contact with the socket assembly for electrical interconnection over a range of transverse positions of the vehicle with respect to the fixture.

3. The apparatus of claim 1 further including shock absorbing means for absorbing a force in excess of a coupling force, the coupling force being such as is required for the engagement of the plug assembly in the socket assembly, said shock absorbing means enabling the socket assembly to be moved over a range of positions in the line of motion of the vehicle during coupling of the plug assembly in the socket assembly.

4. The apparatus of claim 1 wherein the socket electrodes each include a curved portion, each of the curved portions providing a wiping surface for improved contact with each of the plug electrodes.

5. The apparatus of claim 1 further including a weather seal of a flexible material, the weather seal being held in position between the upper and the lower protective plates such that the plug electrodes engage the seal prior to engaging the socket electrodes, the seal being pushed to one side by the plug electrodes during the engaging of the plug assembly and the socket assembly.

6. The apparatus of claim 5 wherein the flexible material is foam rubber and further including a sheath of sheet plastic around the foam rubber for providing a wear surface.

7. The apparatus of claim 1 wherein the cover includes indicia, said indicia being positioned so as to be visible by the operator of the vehicle when the cover is positioned in the open position so as to indicate to the operator that engagement of the plug assembly and the socket assembly is complete.

8. The apparatus of claim 1 wherein the base portion includes a pivotal mount so that the base portion may be moved over a range of angular positions to accommodate the level of the socket assembly, the pivotal mount including position urging means for urging the plug assembly toward a preferred position.

* * * * *